US008327806B2

(12) United States Patent
Haaf

(10) Patent No.: US 8,327,806 B2
(45) Date of Patent: Dec. 11, 2012

(54) PET AMUSEMENT DEVICE

(75) Inventor: David Haaf, San Rafael, CA (US)

(73) Assignee: Worldwise, Inc., San Rafael, CA (US)

( * ) Notice: Subject to any disclaimer, the term of this patent is extended or adjusted under 35 U.S.C. 154(b) by 16 days.

(21) Appl. No.: 13/016,921

(22) Filed: Jan. 28, 2011

(65) Prior Publication Data

US 2012/0090553 A1    Apr. 19, 2012

Related U.S. Application Data

(63) Continuation-in-part of application No. 12/903,447, filed on Oct. 13, 2010.

(51) Int. Cl.
*A01K 29/00* (2006.01)
(52) U.S. Cl. ........................................................ 119/706
(58) Field of Classification Search .................. 119/702, 119/706–711; *A01K 15/02*
See application file for complete search history.

(56) References Cited

U.S. PATENT DOCUMENTS

| | | | | | |
|---|---|---|---|---|---|
| 2,997,019 | A | * | 8/1961 | Bryson | 119/706 |
| D206,579 | S | * | 1/1967 | Sherwood | D30/158 |
| 2,894,487 | A | | 7/1969 | Goldson | |
| 3,479,991 | A | * | 11/1969 | Lichtenberger | 119/28.5 |
| 3,604,397 | A | * | 9/1971 | Salerno | 119/706 |
| D235,270 | S | | 6/1975 | Borak | |
| 4,047,502 | A | * | 9/1977 | Gordon, Jr. | 211/150 |
| 4,253,423 | A | * | 3/1981 | Kaplan | 119/706 |
| 4,517,922 | A | * | 5/1985 | Lind | 119/708 |
| D322,873 | S | * | 12/1991 | Queen et al. | D30/160 |
| 5,517,945 | A | | 5/1996 | Udelle | |
| 5,577,466 | A | * | 11/1996 | Luxford | 119/706 |
| 5,680,831 | A | | 10/1997 | Udelle | |
| 5,806,464 | A | * | 9/1998 | Willinger et al. | 119/706 |
| 5,829,390 | A | * | 11/1998 | Jonilla et al. | 119/706 |
| 5,875,735 | A | * | 3/1999 | Bradley et al. | 119/706 |
| 5,884,586 | A | * | 3/1999 | Carbonelli | 119/485 |
| D444,600 | S | | 7/2001 | Spritzer | |
| 6,345,593 | B1 | | 2/2002 | Stewart et al. | |
| 6,490,996 | B1 | | 12/2002 | Terry | |
| 6,619,237 | B2 | | 9/2003 | Robertson | |
| 6,966,277 | B2 | * | 11/2005 | DeRaspe-Bolles et al. | 119/706 |
| D513,546 | S | * | 1/2006 | Comerford | D30/160 |
| 7,171,922 | B2 | * | 2/2007 | Lipscomb et al. | 119/706 |
| 7,444,959 | B2 | | 11/2008 | Hensley | |
| D614,364 | S | | 4/2010 | Kellogg et al. | |
| 7,765,956 | B2 | | 8/2010 | Lamstein | |
| 2003/0192486 | A1 | * | 10/2003 | DeRaspe-Bolles et al. | 119/706 |
| 2004/0194731 | A1 | * | 10/2004 | Lineberry | 119/706 |
| 2005/0284407 | A1 | * | 12/2005 | DeRaspe-Bolles et al. | 119/706 |
| 2008/0295782 | A1 | * | 12/2008 | Ebert | 119/706 |

OTHER PUBLICATIONS

Image of the Feb 16, 2007 website: http://www.kittykondo.com/halfmoontower.htm.*
Petsmart.com Webpage from Feb. 27, 2009.*

* cited by examiner

*Primary Examiner* — Richard Price, Jr.
(74) *Attorney, Agent, or Firm* — Bay Area Technology Law Group PC

(57) ABSTRACT

A cat amusement and activity device. The device includes a base configured to reside upon a horizontal surface and to support an activity post extending perpendicularly therefrom. The activity post includes a plurality of segments, each such segment comprising a different scratching surface and at least one such scratching surface being a corrugated cardboard cylinder. Other scratching surfaces can include but are not limited to carpet, sisal, rope, seagrass and natural fibers.

2 Claims, 2 Drawing Sheets

PET AMUSEMENT DEVICE

RELATED APPLICATION DATA

The present application is a continuation in part of U.S. application Ser. No. 12/903,447 filed on Oct. 13, 2010.

TECHNICAL FIELD

The present invention is directed to a pet amusement device and particularly to a device which is ideally suited to facilitate cat scratching. The device is easy to construct and inexpensive to maintain it is thus ideally suited for use by domestic cat owners.

BACKGROUND OF THE INVENTION

It is quite important for the health and well being of a domestic cat to not only feed it properly but also to provide stimulating activities. Cats which become bored often times become destructive not only of their surroundings but also of themselves. Cats which are not properly stimulated can actually suffer adverse health effects and as a consequence, proper cat stimulation is a significant consideration for virtually all cat owners.

In addition to pet stimulation, generally, domestic cats require rather unique amusement devices not shared by other domestic pets. Specifically, cats require, among other things, surfaces upon which they can scratch. If an appropriate cat scratching surface is not provided, the cat will use any available surface including upholstered furniture, drapes and rugs to satisfy its need to scratch which could cause significant damage.

There have been a variety of cat scratching devices available in the marketplace for quite some time. The most successful of such devices have surfaces which will eventually be worn out requiring replacement. Such surfaces include, for example, carpet, sisal and corrugated cardboard. Cardboard is the least durable of the cat scratching surfaces but cats enjoy cardboard because the corrugations have the appropriate feel to satisfy their natural scratching tendencies. However, because of the relatively soft nature of corrugated cardboard, scratchers composed of such material must be replaced often tending to unduly contribute to the cost of a cat's maintenance.

It has further been recognized that providing a cat with different scratching surfaces increases the cat's interest in any amusement device. Boredom and disinterest are much less likely to manifest themselves when the cat is provided simultaneously with different cat scratching surfaces from which to choose. It has also been found that certain cats prefer certain surfaces and, as a consequence, providing a universal cat scratching and amusement device which has a variety of surfaces simultaneously available to the cat will greatly increase the probability that the pet amusement and scratching device will be embraced and used by the cat as intended. In this regard, as noted previously, some cat scratching surfaces tend to degrade faster than others. When applied to the present invention, amusement devices which not only have relatively soft highly degradable surfaces as well as more wear resistant surfaces will enable a cat to employ the device even when certain regions cannot provide an appropriate scratching experience until suitable replacement has been carried out.

It is thus an object of the present invention to provide a cat amusement and activity device that includes a plurality of different segments within an activity post providing different scratching surfaces.

Yet another object of the present invention is to provide a cat amusement and activity device where at least a portion of the activity post can be replaced thus refreshing different scratching surfaces.

These and further objects will be more readily appreciated when considering the following disclosure and appended claims.

SUMMARY OF THE INVENTION

A cat amusement and activity device. The device includes a base configured to reside upon a horizontal surface and to support an activity post extending perpendicularly therefrom. The activity post includes a plurality of segments, each such segment comprising a different scratching surface and at least one such scratching surface being a corrugated cardboard cylinder. Other scratching surfaces can include but are not limited to carpet, sisal, rope, seagrass and natural fibers.

DETAILED DESCRIPTION OF THE INVENTION

Figure 1:
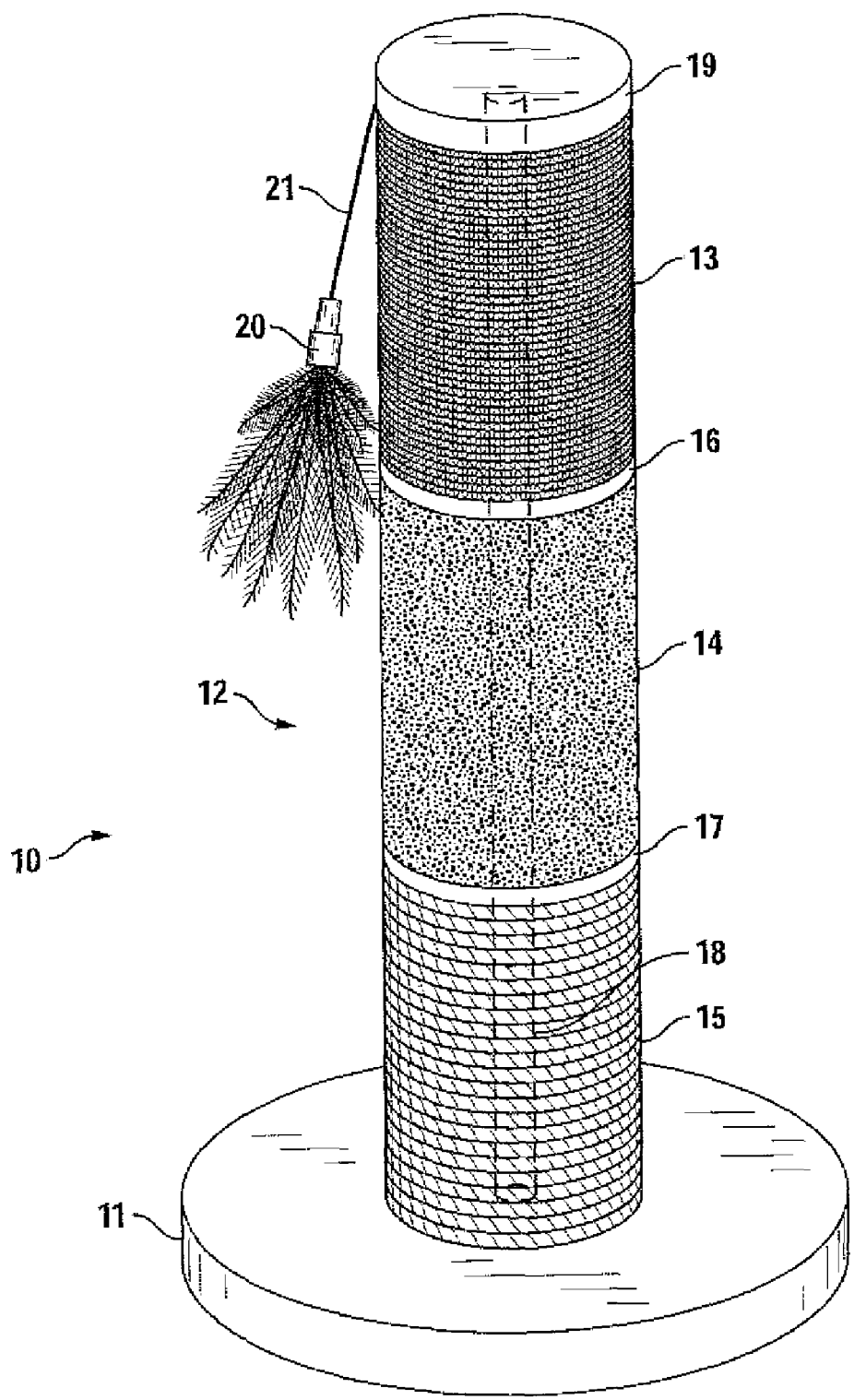
FIG. 1 is a perspective view of the cat amusement and activity device of the present invention.

Novel features which are characteristic of the invention, as to organization and method of operation, together with further objects and advantages thereof will be better understood from the following description considered in connection with the accompanying drawings, in which preferred embodiments of the invention are illustrated by way of example. It is to be expressly understood, however, that the drawings are for illustration description only and are not intended as definitions of the limits of the invention. The various features of novelty which characterize the invention are recited with particularity in the claims.

There has been broadly outlined more important features of the invention in the summary above and in order that the detailed description which follows may be better understood, and in order that the present contribution to the art may be appreciated. There are, of course, additional features of the invention that will be described hereinafter and which will form additional subject matter of the claims appended hereto. Those skilled in the art will appreciate that the conception upon which this disclosure is based readily may be utilized as a basis for the designing of other structures, methods and systems for carrying out the several purposes of the present invention. It is important therefore, that claims be regarded as including such equivalent constructions insofar as they do not depart from the spirit and scope of the present invention.

Certain terminology and the derivations thereof may be used in the following description for convenience and reference only, and will not be limiting. For example, words such as "upward," "downward," "left," and "right" refer to directions in the drawings to which reference is made unless otherwise stated. Similar words such as "inward" and "outward" refer to directions toward and away from, respectively, the geometric center of a device or area and designated parts thereof. Reference in the singular tense include the plural and vice versa, unless otherwise noted.

As noted previously, there is a need to provide domesticated cats with scratching surfaces to satisfy their natural tendency to scratch. Without providing suitable amusement devices for this purpose, cats will tend to scratch household furniture, rugs and drapes causing significant damage to such possessions. Cats very much enjoy scratching a variety of surfaces including corrugated cardboard as the later provides the appropriate resistance to scratching and feel that ideally satisfies the cat's need to scratch. In addition, cats very much enjoy scratching such things as coiled rope, carpet and sisal as each of these various surfaces provide a unique and different scratching experience.

Despite the advantages of corrugated cardboard, there is one distinct disadvantage in using it for a cat scratching medium which the parent '447 application addresses. Specifically, because of the relatively soft and forgiving nature of cardboard, it tends to degrade rapidly. Thus, cardboard scratchers require frequent replacement. Applicant's parent application as well as the present application discusses this issue and addresses it appropriately.

In this regard, reference is made to FIG. 1 depicting cat amusement and activity device 10 including base 11 configured to reside upon a substantially horizontal surface and to support activity post 12 as shown. Thus, activity post 12 extends perpendicularly from the base 11 when base 11 is supported horizontally. Activity post 12 comprises a plurality of segments, each such segment comprising different scratching surfaces. In this illustration, three such scratching surfaces are depicted as being distinct from one another. As an optional expedient, the scratching surfaces can be separated through use of spacers 16 and 17

At least one scratching surface comprises corrugated cardboard cylinder 13. The activity post 12 ideally possesses a central opening for receipt of stem 18. Thus, cardboard cylinder 13 as well as the other scratching segments 14 and 15 can be withdrawn from base 11 by removing cap 19 from stem 18 and simply withdrawing segments as desired. Thus, when corrugated cardboard cylinder 13 is sufficiently worn to necessitate replacement, cap 19 is removed and cardboard cylinder 13 replaced. As noted in applicant's parent application, the disclosure which is incorporated by reference, corrugations of corrugated cardboard cylinder 13 extend to its outer surface and are thus open and fully accessible to a cat during use. Applicant's parent application further noted that corrugated cardboard cylinder 13 could be produced from a large corrugated block cut round with a concentric center bore. Alternatively, two half sections could be cut from one or more corrugated blocks and glued together at a seam parallel to stem 18. As yet a further embodiment, a series of corrugated discs could be employed and, in this regard, applicant's parent application shows this in FIG. 4 of that disclosure incorporated by reference herein.

As noted previously, it is the intent of the present invention to provide a plurality of different scratching surfaces. Ideally, the scratching surfaces comprise, but are not limited to, a member selected from the group consisting of carpet, sisal, rope, seagrass and natural fibers. In turning to FIG. 1, it is noted that the segment closest to base 11, namely, segment 15 is comprised of rope helically wound as having an outer diameter approximately equivalent to the remaining segments of activity post 12. Between rope segment 15 and cardboard segment 13 is carpet segment 14. Again, each segment 13, 14 and 15 provide a different scratching sensation to a cat noting further that, in all likelihood, cardboard segment 13 will wear faster than either segments 14 and 15 and it is anticipated that cardboard segment 13 will be replaced more frequently than the remaining segments of the cat amusement and activity device of this invention.

Figure 2A:
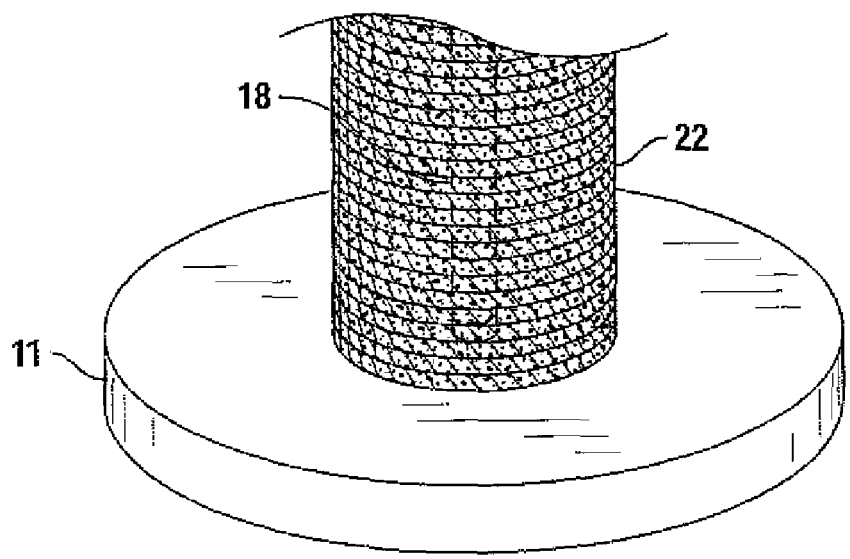
FIGS. 2A and 2B are partial views of alternative scratching surfaces useful in practicing the present invention.
Figure 2B:
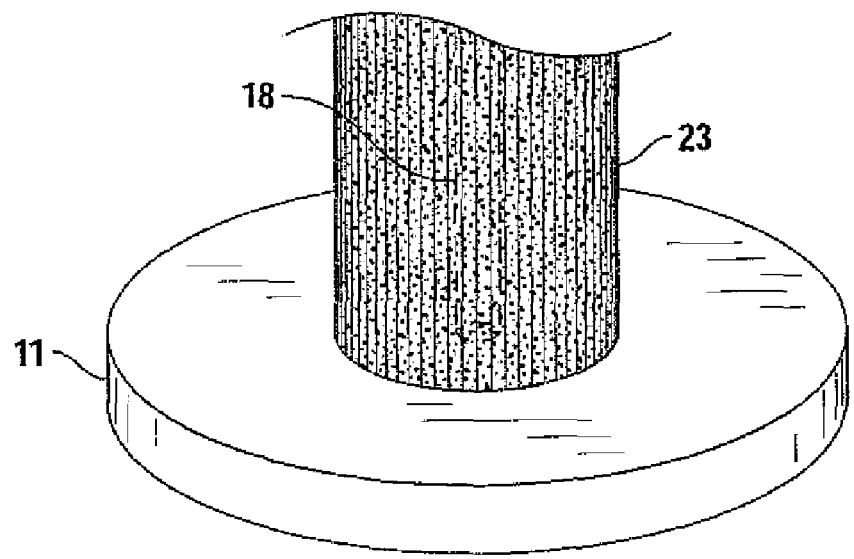

In turning to FIGS. 2A and 2B, seagrass surface 22 and sisal surface 23 are shown, respectively, above base 11.

It is also noted, as a further preferred embodiment, that the present cat amusement and activity device can also include an attractant toy. In this instance, a feathered toy 20 is supported by umbilical 21 from atop activity post 12. It is anticipated that a cat will not only use the present invention as a scratching device but will also occasionally swat at activity toy 20 during its use.

The above disclosure is sufficient to enable one of ordinary skill in the art to practice the invention, and provides the best mode of practicing the invention presently contemplated by the inventor. While there is provided herein a full and complete disclosure of the preferred embodiments of the invention, it is not desired to limit the invention to the exact construction, dimensions, relationships, or operations as described. Various modifications, alternative constructions, changes and equivalents will readily occur to those skilled in the art and may be employed as suitable without departing from the true spirit and scope of the invention. Such changes might involve alternative materials, components, structural arrangements, sizes, shapes, forms, functions, operational features or the like. Therefore, the above description and illustration should not be considered as limiting the scope of the invention, which is defined by the appended claims.

What is claimed is:

1. A cat amusement and activity device comprising a base configured to reside upon a substantially horizontal surface and to support a stem emanating therefrom, a plurality of cylinders, each having a central opening for being received by said stem and being stackable thereon, said plurality of cylinders having at least two different scratching surfaces, at least one of said cylinders comprising corrugated cardboard and at least one of such cylinders comprising a member selected from the group consisting of cardboard, sisal, seagrass and rope.

2. The cat amusement and activity device of claim 1 further comprising a cap removably affixed to said stem wherein upon removal of said cap, said plurality of cylinders are selectively removable from said stem for replacement and repositioning.

* * * * *